Jan. 14, 1969 P. D. BREHM ET AL 3,421,224
AIR TURBINE DRIVE CARTRIDGE FOR DENTAL DRILL
Filed Sept. 10, 1964
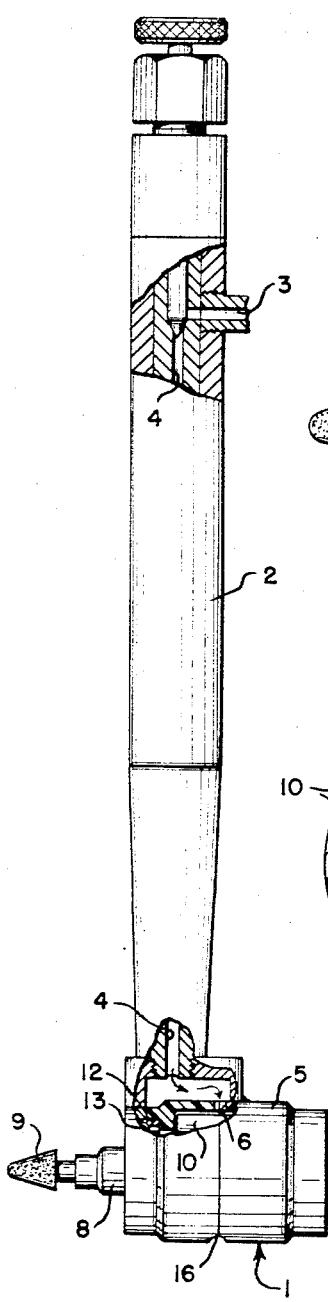
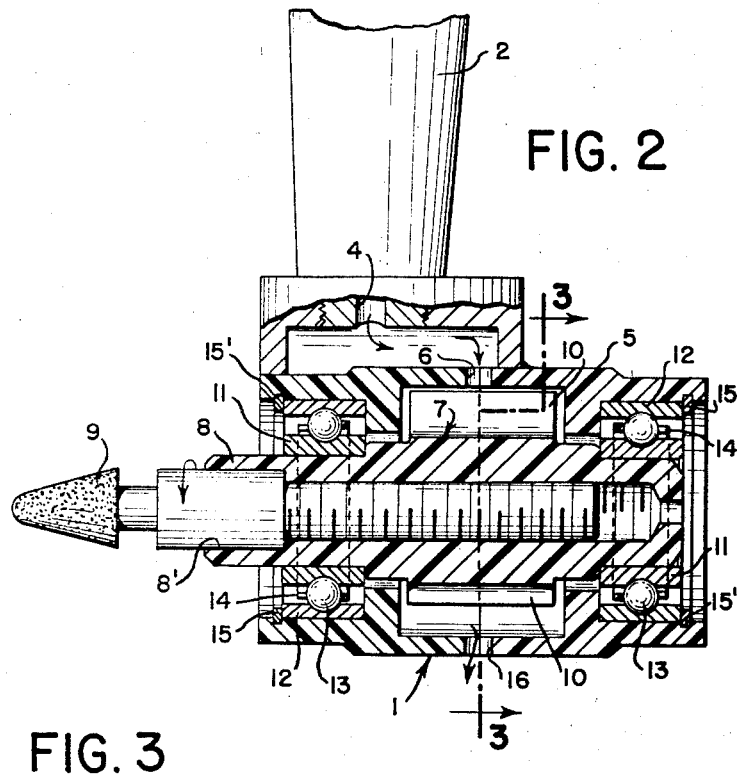
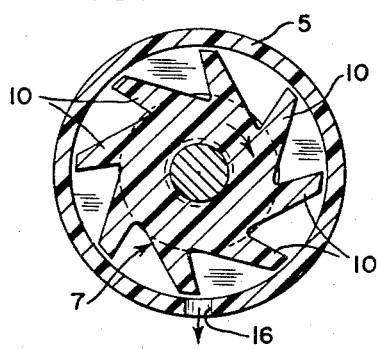
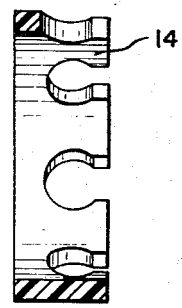
INVENTORS
PAUL D. BREHM
RAYMOND H. CARTER
BY
ATTORNEYS INVENTORS
PAUL D. BREHM
RAYMOND H. CARTER
BY
Pennie, Edmonds, Morton, Taylor & Adams
ATTORNEYS – # United States Patent Office 3,421,224
Patented Jan. 14, 1969

3,421,224
AIR TURBINE DRIVE CARTRIDGE FOR DENTAL DRILL
Paul Donald Brehm and Raymond H. Carter, Keene, N.H., assignors to MPB Corporation, Keene, N.H., a corporation of New Hampshire
Continuation-in-part of application Ser. No. 181,974, Mar. 23, 1962. This application Sept. 10, 1964, Ser. No. 396,808
U.S. Cl. 32—27  7 Claims
Int. Cl. A61c 1/12

This application is a continuation-in-part of our copending application Ser. No. 181,974 entitled Air Turbine Drive Cartridge for Dental Drill, filed Mar. 23, 1962 and now abandoned.

This invention relates generally to a turbine operated rotary tool drive cartridge and more particularly to a cartridge unit wherein certain parts are made of a hard, smooth-surface plastic.

Presently, turbine operated, rotary tool drive means such as used with dental drills are constructed as cartridge units which are adapted to be connected to a suitable source of fluid pressure such as air. These cartridge units are made of metal and comprise in general a turbine housing having a turbine shaft rotatably mounted therein with one end of the shaft provided with means for holding the particular work tool desired. The turbine housing is usually cylindrical in shape with the turbine shaft positioned along its longitudinal axis and extending out one end thereof. Turbine blades are fixed to the part of the shaft disposed within the housing and extend radially therefrom. The housing, in turn, is provided along one side with an inlet port through which fluid under pressure is adapted to be admitted so as to strike the turbine blades and rotate the shaft. An outlet port is disposed on the diametrically opposite side of the housing through which the fluid exits after striking the turbine blades. To rotatably secure the turbine shaft within the housing, inner and outer race members are disposed within the housing. The inner race members are fixed to the turbine shaft on either side of the turbine blades while the outer race members are fixed to the housing and disposed concentrically with respect to their cooperating inner race members. Suitable anti-friction elements are disposed between these co-operating race members for permitting relative rotation of the turbine shaft with respect to the turbine housing, and the elements are spaced from each other around the circumference of the turbine shaft by means of retainer rings.

Since it is the present practice to make the various parts of the cartridge of metal such as aluminum and brass or nickel-silver, the cost of manufacturing is relatively expensive. This is due to some extent to the cost of the metal itself and also the fact that the parts must be machined to extremely close tolerances.

In the application of dental handpieces it is required that the cutting bur be inserted into the end of the turbine shaft. It is held therein by friction in a plastic or metal collet within the rotor shaft bore. The amount of force required to insert and extract the bur into standard cartridges ranges from five to eighteen pounds. The force being thus exerted is a pure thrust load carried wholly by the ball bearings, which, at 16 pounds, produces a contact area stress of 350,000 p.s.i. in the ball groove of the bearing. This stress can cause permanent deformation in the groove at the point of contact between the ball and the ball groove, increasing noise and reducing life of the cartridge.

With the standard metal cartridge assembly presently in use, these bur insertion and extraction forces bear directly on the points of contact between the balls and ball grooves because the cartridge does not yield to relieve the contact area stress.

Also, with metal parts, and in particular those used in dental drills, the noise created during operation resulting from the engagement of the metal parts and the air rushing through the turbine device is objectionable. As the operating speed of the drill increases, the noise level increases a corresponding amount. This noise is a high pitch whine and it is apparent that this whining noise becomes most objectionable to the patient as the speed of the drill is increased to its effective operating point.

The cartridge unit as defined by the present invention substantially reduces these objectional characteristics by having certain critical parts of the turbine cartridge constructed of yieldable plastic material having a hard and smooth outer surface. More particularly, the improved cartridge unit has a plastic housing, plastic retainer rings, a plastic turbine shaft, and plastic turbine blades.

Since the various parts of the turbine drive as defined by the present invention are made of plastic material, they may be accurately produced by molding. By molding, the cost of production of the parts may be reduced by a factor of five as compared with the cost of metal parts that subsequently need to be machined. The cost, other than for the bearings, is low enough to give the dentist a throw away cartridge instead of a $50 original investment that has only a $20 trade-in potential as metal cartridge units presently on the market.

It has also been discovered that the operating life of the cartridge unit is increased as much as four to five times the ordinary operating life of similar cartridges made of metal. Metal cartridge units, on the average, have an operating life of 75 hours. In the case of the plastic cartridge units constructed according to the teachings of the present invention, the operating life is increased as much as four to five times. It is thought that the reason for this increased operating life is the fact that the retainer-to-ball loading is substantially reduced because of the use of a lighter turbine shaft combined with the use of light retainers. The net effect is less aggravating working of the lubricant and a longer bearing life.

Also, the plastic employed in the cartridge assembly acts as an efficient shock absorber that absorbs and dissipates the high frequency vibrations generated by the high rotational speeds of the turbine shaft. By absorbing these vibrations at their inception, they are not permitted to reach the bearings and set up a high frequency hammer between the rings and balls that result in their destruction.

In present constructions having a metal housing, rotor, and shaft, the parts act to generate and amplify high frequency vibrations which result in bearing destruction.

Another and very important advantage produced by using a smooth-surface plastic for these critical parts of the cartridge unit resides in its high operating speed obtainable without bothersome noise. With high-speed dentists' drills, an essential factor in reducing the pain felt by the patient when the drill is pressed on the tooth is the high speed at which the drill rotates. The higher this speed, the less the pressure that is necessary to drill into the tooth and consequently not as much discomfort to the patient.

High-speed dentists' drills are presently supplied with air under a pressure of 40 p.s.i. for driving the turbine and as previously pointed out these drills when produced with metal parts will rotate at speeds in the neighborhood of 350,000 r.p.m. Using this same pressure of 40 p.s.i. for operating a turbine drive wherein the housing, shaft, blades, and retainer rings are made of a hard thermoplastic material of approximately one-sixth the weight of corresponding aluminum and brass parts, the effective operating speed of the tool is increased by 10,000 to 25,000 r.p.m. The increased speed is made possible primarily because of the reduction in the weight of the turbine itself. It follows that with this reduction in weight the amount of energy required to bring that mass of material up to and maintain it at operating speed is substantially reduced.

Another important advantage resulting from the use of smooth-surface plastic components is the increased safety with which they may be used. With high speed dentists' drills, it is of paramount importance that the speed of the drill be quickly responsive to the amount of driving force supplied. With lighter components in the turbine drive, the acceleration and deceleration times are reduced by several seconds thereby permitting safer handling near the patient.

As indicated previously, conventional high speed drills having metal parts for the turbine drive produce an objectionable whining noise. It would appear that with a turbine drive having thermoplastic parts which allow speeds over 375,000 r.p.m., the noise created would be extremely high and shrill. With hard smooth-surface plastic parts, however, the whining noise is substantially reduced rather that increased and substantially the only noise audible is that created by the air rushing through the exhaust port. A primary reason for the elimination of this whining noise characteristic of conventional high speed drills is thought to be the fact that the plastic surfaces of the turbine over which the air passes are exceptionally smooth when produced by the molding operation.

The handpiece in which the cartridge units of the present invention is held is generally machined from half-hardened brass, that is, brass that has been work hardened to only half the extent possible, and arranged to hold the cartridge in place by direct contact with the end of the front outer race member of the assembly.

The high frequency vibrations generated in and by the metal cartridge constructions permit the face of this bearing to wear away the inside of the brass housing. The brass material that is worn away enters the ball bearings and, in turn, causes its early failure. The extraction forces on the tool also cause the front bearing's outer race to be forced into the brass, indenting it and thereby accelerating the wear and failure caused by the high frequency vibrations.

With the use of the plastic cartridge assembly of the present invention, the high frequency vibrations are minimized or eliminated and, when they do occur, are absorbed by the housing through the bearing. Also, the extraction forces on the tool are partially taken up by the yield of the cartridge and consequently do not act with sufficient force against the front bearing to cause it to indent the housing.

According to the teaching of the present invention, the turbine housing, turbine shaft and blades, and the retainer rings can be made of any suitable hard smooth-surface plastic material. For example, satisfactory results are produced by forming these parts from a high molecular weight polyoxymethylene such as acetal resin which is very strong and stiff yet quite yieldable and resilient in nature. Materials such as polyethylene, plexiglass, tetrafluoroethylene resins and nylon also produce the desired results. Essential requirements of the particular plastic used are that it be light enough to allow quick acceleration and deceleration responsive to the driving force exerted on the turbine blades, yieldable to absorb shock forces, and have a hard, smooth surface to allow substantially noiseless flow of air thereover.

Referring to the drawings:

FIG. 1 is a side elevation view partly in cross section of a dental drill handpiece having a turbine operated rotary cartridge;

FIG. 2 is a cross-sectional view of the cartridge unit constructed according to the present invention;

FIG. 3 is a cross-sectional view taken along lines 3—3 of FIG. 2;

FIG. 4 is a cross-sectional view of one of the ball bearing retainer rings; and

Figure 5:
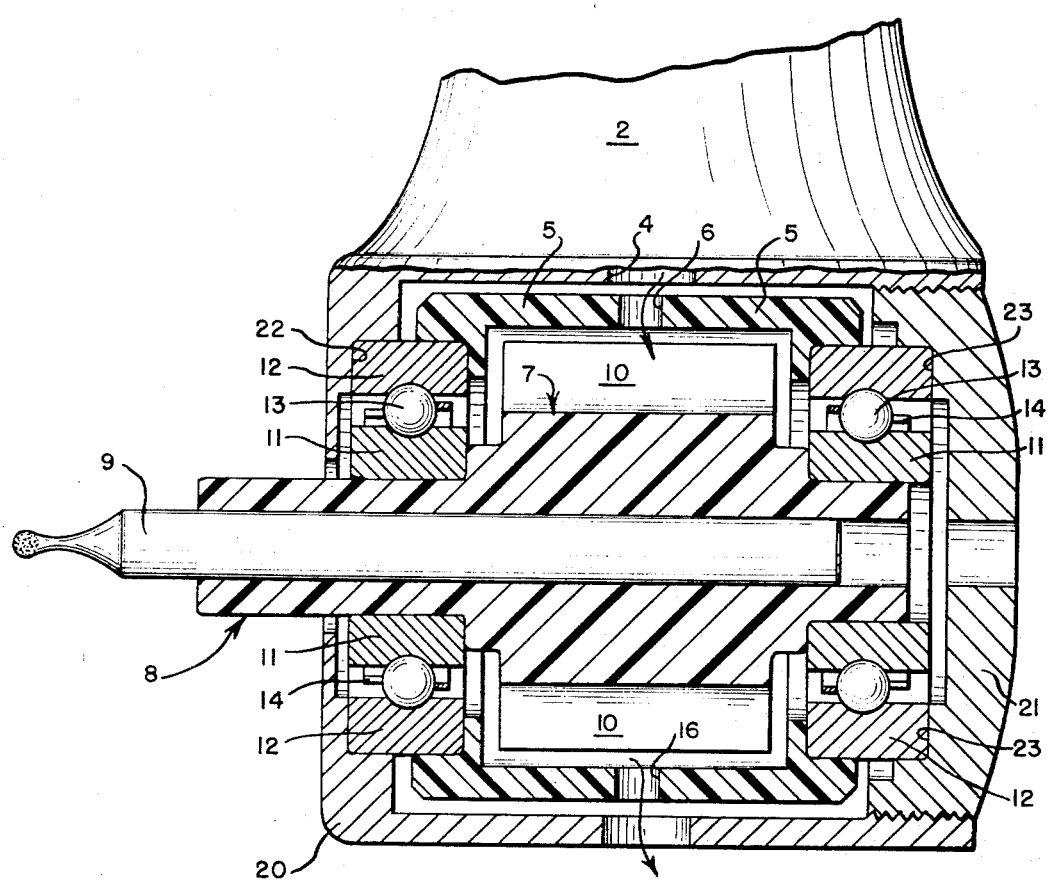
FIG. 5 is a cross-sectional view of the cartridge assembly of the present invention disposed within a modified form of an operating handle.

As shown in FIG. 1 the cartridge unit 1 is connected to the lower end of a handle 2 which is made of half-hardened brass. The handle is provided at its other end with an inlet port 3 adapted to be connected to a suitable source of air pressure. The handle has a central bore 4 extending from this inlet port through the lower end and into communication with the cartridge unit. As shown in FIG. 2 the cartridge unit comprises a cylindrical housing 5 having an inlet port 6. When the cartridge unit is connected to the end of the handle 2 the housing inlet port 6 will be disposed in communication with the outlet of the central bore 4 of the handle.

A turbine shaft 7 is disposed within the housing and extends along its longitudinal axis with one end 8 projecting beyond the end thereof. The turbine shaft has a central bore 8' which is adapted to hold a working tool 9. Turbine blades 10 extend radially outwardly from the part of the turbine shaft disposed within the housing. These turbine blades may be formed as an integral part of the turbine shaft as more clearly shown in FIG. 3. For example, the shaft and turbine assembly can be finish molded as one unit with only a reaming of the shaft bore necessary.

Secured to the turbine shaft on either side of the turbine blades are inner race members 11. Outer race members 12 are fixed to the turbine housing at points concentrically disposed with respect to the inner race members. These race members are AISI440C steel, hardened to a 60 Rockwell "C." Anti-friction elements comprising balls 13 are positioned between the cooperating race members and are held spaced from each other around the circumference of the turbine shaft by means of retainer rings 14. Snap rings 15 are fitted into grooves 15' contained in each end of the turbine housing to hold the component parts of the bearing assembly therein.

An outlet port 16 is located on the side of the turbine housing diametrically opposite the inlet port 6.

FIG. 5 shows a modified construction in which the cartridge 1 is connected to the lower end of the handle 2 and held in position by a handle housing 20 and a threaded cartridge retaining cap 21 defining a part of such housing.

In this construction, the handle housing is made of half-hard brass while the cap is made of corrosion resistant steel. Also, the front outer race 12 is disposed in direct contact with handle housing 20 as shown at 22 while the back outer race 12 is in direct contact with the cartridge retaining cap 21 as shown at 23. With this construction, the high frequency vibrations generated by the high rotational speed of the turbine shaft would normally tend to be transmitted to the handle housing through the steel hardened front race 12 and cause wear of the handle housing. Also, upon removal of the working tool, there would normally be a tendency for the outer race 12 to indent the handle housing and thereby accelerate the wear and failure caused by the high frequency vibrations. As indicated above, wear of the handle housing permits the brass material that is worn away to enter the ball bearing and in turn hasten its failure.

In accordance with the teachings of the present invention, however, where the turbine shaft and blades and the turbine housing are made of the hard, smooth-surfaced plastic that is yet yieldable in nature, wear of the handle housing is reduced to a minimum since any vibrational forces are effectively eliminated before they reach the handle housing. Also, extraction forces caused by removal of the working tools are minimized by being absorbed by the plastic components of the cartridge. Consequently, the life of the cartridge unit of the present invention is greatly increased over conventional cartridges in which some or all of the parts are made of metal.

According to the teaching of the present invention, the turbine housing 5, the turbine shaft 7, and blades 10, and the ball bearing retainer rings 14 are preferably made of a hard, smooth-surface, yieldable plastic material such as that manufactured and sold by E. I. du Pont de Nemours & Co. under the name Delrin. By using plastic parts, the housing may be molded in two halves in the same mold and cemented or stapled together cheaply and quickly; and due to the material used, the bearing bore to shaft fits are critical only as far as any compression would affect the shaft bore diameter. Furthermore, the yield and compression characteristics of the plastic body contribute to the locking of the handpiece without heavy torque loads and aid in the absorption of any compression and shock forces caused by tool insertions and extractions. This, in turn, reduces the magnitude of the loads on the bearings which themselves are very small and easily damaged. Finally, although the primary difference over conventional high-speed drills resides in the substitution of a hard, smooth-surface plastic material for certain metal parts, the cooperation between these parts produced according to the teaching of this invention produces unexpected noise reduction, increased speed, longer life of the cartridge unit, and faster acceleration and deceleration speeds of the turbine shaft due to the low moments of inertia involved.

We claim:
1. In a turbine drive cartridge adapted for insertion into a dental tool handle housing for holding the cartridge and for rotating a tool attached to the cartridge at speeds in excess of 375,000 r.p.m., the improvement comprising:
  (a) a hard smooth surface plastic cartridge housing adapted to be positioned in fixed relation within said handle housing and having an inlet port in communication with a source of air under pressure and an outlet port in communication with the atmosphere;
  (b) a hard and smooth surface plastic turbine shaft having a low moment of inertia rotatably mounted in said cartridge housing and having a plurality of turbine blades formed integral therewith and extending radially outwardly from the intermediate portion thereof;
  (c) concentric inner and outer cylindrical race members having anti-friction elements therebetween disposed at least partially within said cartridge housing at either end thereof and surrounding said turbine shaft with said inner race members fixed to said turbine shaft, and said outer race member fitted to said cartridge housing, said smooth surface plastic housing, turbine shaft and turbine blades cooperating together when said shaft is rotated at high speeds to substantially reduce the noise of operation of said cartridge, and
  (d) means for securing a working tool to one end of said turbine shaft.

2. In a turbine drive cartridge adapted for insertion into a dental tool handle housing for holding the cartridge and for rotating a tool attached to the cartridge at speeds in excess of 375,000 r.p.m., the improvement comprising:
  (a) a hard and smooth surface plastic cartridge housing adapted to be positioned within said handle housing in spaced relationship therewith and having an inlet port in communication with a source of air under pressure and an outlet port in communication with the atmosphere,
  (b) a hard and smooth surface plastic turbine shaft having a low moment of inertia rotatably mounted in said cartridge housing and having a plurality of turbine blades formed integral therewith and extending radially outwardly from the intermediate portion thereof,
  (c) concentric inner and outer cylindrical race members disposed within said cartridge housing and extending outwardly of the ends thereof and surrounding said turbine shaft with said inner race members fixed to said turbine shaft, and said outer race members fixed to said cartridge housing to provide the only support of said cartridge housing within said handle housing through axial and circumferential engagement therewith to prevent movement of said cartridge within said handle housing longitudinally of said turbine shaft,
  (d) anti-friction elements disposed between said inner and outer race members,
  (e) a retainer ring disposed between each of the inner and outer race members for maintaining said bearings in a predetermined spaced relationship about the circumference of the turbine shaft, said smooth surface plastic housing, turbine shaft and turbine blades cooperating together when said shaft is rotated at high speeds to substantially reduce the noise of operation of said cartridge and,
  (f) means for securing a working tool to one end of said turbine shaft.

3. A turbine drive cartridge as set forth in claim 2 wherein the retainer rings are made of a hard and smooth surface plastic.

4. A turbine drive cartridge as set forth in claim 3 wherein the plastic turbine housing, turbine shaft and blades, and retainer rings are made of a thermally stable, high molecular weight, polyoxymethylene.

5. An air-driven dental tool comprising:
  (a) an elongated handle with a handle housing fixed thereto at one end,
  (b) a turbine drive cartridge for rotating a tool at speeds in excess of 375,000 r.p.m. positioned within said handle housing and including
    (1) a hard and smooth surface plastic cartridge housing positioned within said handle housing in spaced relationship therewith, said cartridge housing having an inlet port in communication with a source of air under pressure and an outlet port in communication with the atmosphere,
    (2) a hard and smooth surface plastic turbine shaft having a low moment of inertia rotatably mounted in said housing and having a plurality of turbine blades formed integral therewith and extending radially outwardly from the intermediate portion thereof,
    (3) concentric inner and outer cylindrical, steel race members disposed within said cartridge housing and extending outwardly of the ends thereof and surrounding said turbine shaft with said inner race members fixed to said turbine shaft, and said outer race members fixed to said cartridge housing and in axial and circumferential engagement with said handle housing to prevent movement of said cartridge longitudinally of said turbine shaft, said outer race members providing the only support of said cartridge within said handle housing,
    (4) anti-friction elements disposed between said inner and outer race members, (5) a retainer ring disposed between each inner and outer race members for maintaining said bearings in a predetermined spaced relationship about the circumference of the turbine shaft, said smooth surface plastic cartridge housing, turbine shaft and turbine blades and cooperating together when said shaft is rotated at high speeds to substantially reduce the noise of operation of said cartridge, and (6) means for securing a working tool to one end of said turbine shaft.

6. An air-driven dental tool as set forth in claim 5 wherein:
(a) said handle housing is constructed of half-hardened brass; and
(b) said race members are made of steel hardened to a 60 Rockwell "C."

7. An air-driven dental tool as set forth in claim 6 wherein said means for securing a working tool to the turbine shaft is defined by a frictional connection.

References Cited
UNITED STATES PATENTS

| | | | |
|---|---|---|---|
| 2,764,009 | 9/1956 | Wernert | 103—114 X |
| 2,791,182 | 5/1957 | Sheidl | 103—114 X |
| 2,897,596 | 8/1959 | Maurer | 32—27 |
| 2,945,299 | 7/1960 | Fritz | 32—27 |
| 2,983,519 | 5/1961 | Staunt | 32—27 |
| 3,039,397 | 6/1962 | Prasse et al. | 103—114 X |
| 3,046,585 | 7/1962 | Ledingham et al. | 253—2 X |

OTHER REFERENCES

Goodman, H. H., and Scarborough, W. J.: "Delrin" Acetal Resin, A New Plastic for Body Engineers, Oct. 24, 1958. The American Society of Body Engineers Inc., pp. 18, 19, 20.

LOUIS G. MANCENE, *Primary Examiner.*

C. R. WENTZEL, *Assistant Examiner.*